US007307651B2

(12) United States Patent
Chew

(10) Patent No.: US 7,307,651 B2
(45) Date of Patent: Dec. 11, 2007

(54) TWO-WAY MOBILE VIDEO/AUDIO/DATA INTERACTIVE COMPANION (MVIC) SYSTEM

(75) Inventor: Mark A. Chew, 6813 Station Rd., West Chester, OH (US) 45069

(73) Assignee: Mark A. Chew, West Chester, OH (US)

( * ) Notice: Subject to any disclaimer, the term of this patent is extended or adjusted under 35 U.S.C. 154(b) by 0 days.

(21) Appl. No.: 10/966,320

(22) Filed: Oct. 15, 2004

(65) Prior Publication Data

US 2005/0099493 A1 May 12, 2005

Related U.S. Application Data

(60) Provisional application No. 60/511,760, filed on Oct. 16, 2003.

(51) Int. Cl.
*H04N 7/15* (2006.01)

(52) U.S. Cl. .................................. 348/14.09; 348/14.02

(58) Field of Classification Search .. 348/14.01–14.16; 379/90.01, 93.01, 93.05–93.08, 93.17, 93.23, 379/110.01
See application file for complete search history.

(56) References Cited

U.S. PATENT DOCUMENTS

| | | | | |
|---|---|---|---|---|
| 5,933,479 A | * | 8/1999 | Michael et al. | 379/110.01 |
| 5,956,076 A | * | 9/1999 | Hoess | 725/118 |
| 6,342,915 B1 | * | 1/2002 | Ozaki et al. | 348/61 |
| 6,549,229 B1 | * | 4/2003 | Kirby et al. | 348/14.01 |
| 6,724,416 B1 | * | 4/2004 | Liu | 348/14.02 |
| 6,956,614 B1 | * | 10/2005 | Quintana et al. | 348/373 |
| 7,035,897 B1 | * | 4/2006 | Devereaux et al. | 348/211.99 |
| 2003/0231238 A1 | * | 12/2003 | Chew et al. | 348/14.02 |
| 2004/0041902 A1 | * | 3/2004 | Washington | 348/14.01 |
| 2004/0146013 A1 | * | 7/2004 | Song et al. | 370/279 |
| 2004/0233877 A1 | * | 11/2004 | Lee et al. | 370/338 |

\* cited by examiner

*Primary Examiner*—Stella Woo
(74) *Attorney, Agent, or Firm*—Frost Brown Todd LLC

(57) ABSTRACT

A roaming videoconferencing (VTC) system incorporates a portable VTC device with client bridge wireless connectivity that couples to the closest access point (AP) assembly with FCC compliant, enhanced range. Use of APs in combination with amplified directional antennas is successfully demonstrated for two-way VTC, even given their generally-known low Effective Isotropic Radiated Power (EIRP) and half-duplex broadcasting. Optional video, audio and data wireless and capabilities are incorporated into the portable VTC device. Facilities that have a connection to Internet or an ISDN public switched telephone network may thus flexibly provide high-quality VTC to widely spaced parts of the facilities, grounds or work site without the inconvenience or expense of placement of ISDN lines.

2 Claims, 14 Drawing Sheets

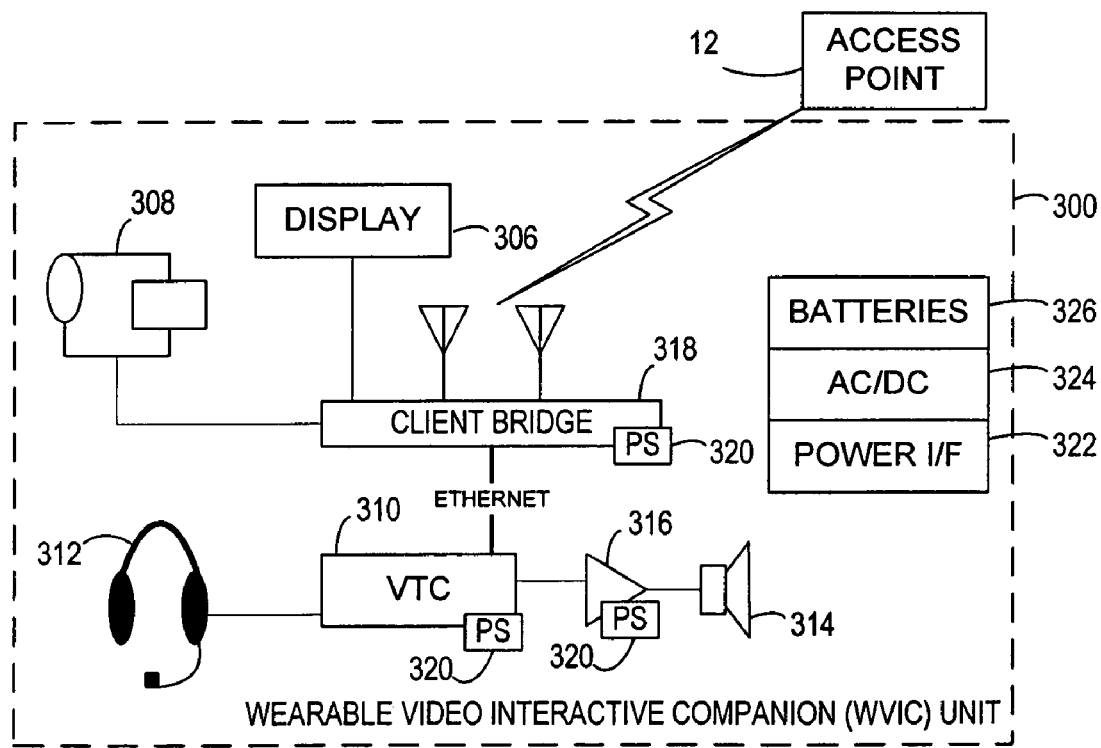
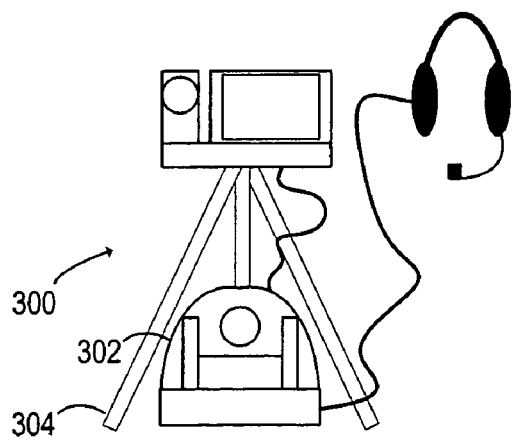
FIG. 5

Video Arraignment

FIG. 12 Personal Video Interactive Companion (PVIC)

*Trade Show Configuration*
*Mobile Video Interactive Companion (MVIC)*
*Personal Video Interactive Companion (PVIC)*

TWO-WAY MOBILE VIDEO/AUDIO/DATA INTERACTIVE COMPANION (MVIC) SYSTEM

CROSS REFERENCE TO RELATED APPLICATIONS

The present application claims the benefit of U.S. provisional application Ser. No. 60/511,760 of the same title filed on 16 Oct. 2003.

FIELD OF THE INVENTION

The present invention relates, in general, to systems that transmit two-way video, audio, and data between a mobile site and a fixed site, and in particular to systems that further communicate to other fixed sites via the public telecommunications infrastructure (e.g., ISDN, Internet).

BACKGROUND OF THE INVENTION

Advances in telecommunication have allowed wireless data networking to abound. Laptops, cell phones, personal digital assistants (PDAs), and other consumer electronic devices are increasingly interconnected with public telecommunication networks such as the Plain Old Telephone System (POTS) or the Internet for sending text messages, hypertext data, digital photographs, etc. To a very limited extent, these portable devices may transmit and receive low-resolution digital streaming audio and video signals, often significantly buffered. The result is generally unsatisfactory to those who need high quality two-way video, audio and data communications.

While these portable capabilities are satisfactory for many purposes, two-way videoconferencing and similar high-bandwidth audio and data transmission are not well supported to remote locations. This is in contrast to fixed location capabilities that are ubiquitous in various institutions where there is a large terrestrial communication infrastructure of videoconferencing systems, telephone, data networks, etc. Businesses and institutions use these communication links for two-way high-resolution audio and video transmission, Internet access, presentation visual graphics, telephone communication, email, and facsimile documents. However, these land-based solutions are limited to fixed locations and require significant amounts of time to add new locations.

In the recent past, a truly portable, high-quality two-way video/audio/data transmission was achievable, as described in "Mobile Videoconferencing System" to Mark Chew et al., Ser. No. 10/339,919, filed on 10 Jan. 2002, the disclosure of which is incorporated by reference in its entirety. Therein, a Technical Operations Center (TOC) interfaced a satellite communication channel to the terrestrial-based communication nodes (e.g., POTS, ISDN lines, Internet, etc.). At the other end of the satellite communication channel, a mobile system in shipping containers or installed in a vehicle quickly locked onto the satellite. Further portability was achieved by a Radio Frequency (RF) transmission from the mobile system to a portable system.

The portable part of the system, a "Video Interactive Companion" (VIC), extended the mobility of the system, allowing videoconferencing from locations that were not directly accessible to a vehicle. A radio frequency communication link from the mobile portion of the system successfully traversed a distance such as approximately 200 feet and into a building. Specifically, an access point is set up on the mobile system and another access point is incorporated into the VIC. The VIC also used static addressing. Thereby, a point-to-point solution was provided by the VIC in combination with the mobile system and its satellite communication link, albeit with limitations such as one-way video.

While the Mobile Videoconferencing System readily provided two-way broadband video, audio and data to remote locations at a reasonable cost, there are instances where setting up the link between the mobile system and the VIC was problematic. For instance, placement of the VIC is dictated by the range of the mobile system, which has power transmission limitations. In addition, in many industrial and business settings desirable locations for video/audio/data communications may be blocked by a significant number of structures and interfering signals. Consequently, the VIC was not able to roam while maintaining communication.

In addition, there are instances wherein the location is not so remote as to require a satellite communication link. In addition, even though the satellite link described is relatively inexpensive compared to traditional satellite communication, it would be desirable to avoid this expense if possible. In particular, there are situations where institutions do not have ISDN (Integrated Switched Digital Networks) access everywhere that they would like to videoconference. The cost of installation and maintenance for an ISDN may be too high or the existing IP data network is insufficient in bandwidth for quality of service for digital video. Typically, such an institution has specific conference rooms that are wired for videoconference equipment. Often, it is inconvenient to hold all such videoconferences in these limited number of locations, or it would be desirable to have additional simultaneous videoconferences. For instance, a public attraction such as an aquarium has numerous exhibits and marine specimens of interest to many educational institutions that are not near to a similar facility. Education would be enhanced by having the videoconferences with the experts at the exhibits rather than being limited to what can be carried into a fixed conference room.

A partial answer to such portable videoconferencing has been available, albeit with a number of significant drawbacks. A VRS LIBERTY conferencing system is connected to an ISDN line via a fixed VTC room. A video/audio analog signal from a nearby broadcasting location is transmitted via a 2.4 GHz carrier to the conferencing system. A two-way audio communication channel is maintained with the broadcasting location via a separate VHF channel. Thereby, a camera operator can communicate with a distant broadcast recipient who is participating via the ISDN line.

This portable videoconferencing suffers from multipath signal distortion and other problems related to its analog transmission. The conferencing system requires that an ISDN line be available, which is often not the case in institutions with only POTS and Internet connectivity. Furthermore, at the broadcast location, only a return audio signal is provided, which disables videoconferencing. Furthermore, communication is poor when roaming.

A significant need exists for a portable two-way videoconferencing system that provides high quality audio, video and data to a broadcast location that is comparable in cost to fixed location ISDN videoconference systems.

BRIEF SUMMARY OF THE INVENTION

The invention overcomes the above-noted and other deficiencies of the prior art by providing improved wireless digital data access points which reach various locations within a building or within a given radius outside of the building. A mobile video/audio/data interactive companion (MVIC) system takes advantage of this reliable communication channel by integrating two-way audio, video and data features at a remote location. Thereby, a videoconference with the fidelity similar to a fixed location videoconference site is achieved, even when moving the MVIC system to the remote location.

In one aspect of the invention, a roaming videoconferencing system includes a portable videoconferencing device that wirelessly two-way communicates via a client bridge to a packet-based, half-duplex access point that has enhanced range by utilizing diversity antennas with transmit and receive switching to support solid state power amplified transmission and low noise amplified reception. Thereby, the videoconferencing system may be widely spaced from a terrestrial connection to the Internet and/or Integrated Switched Digital Networks (ISDN).

In another aspect of the invention, a roaming videoconferencing system includes a directionally tuned antenna array to a network-coupled access point. A portable videoconferencing device includes wireless connectivity via a direct sequence spread spectrum client bridge which may be placed distantly across a work site yet remain in communication with the system.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 5 depicts a block diagram of a wearable Video Interactive Companion (WVIC) with enhanced portability which allows the system to be carried in a backpack to remote locations.

DETAILED DESCRIPTION OF THE INVENTION

Figure 1:
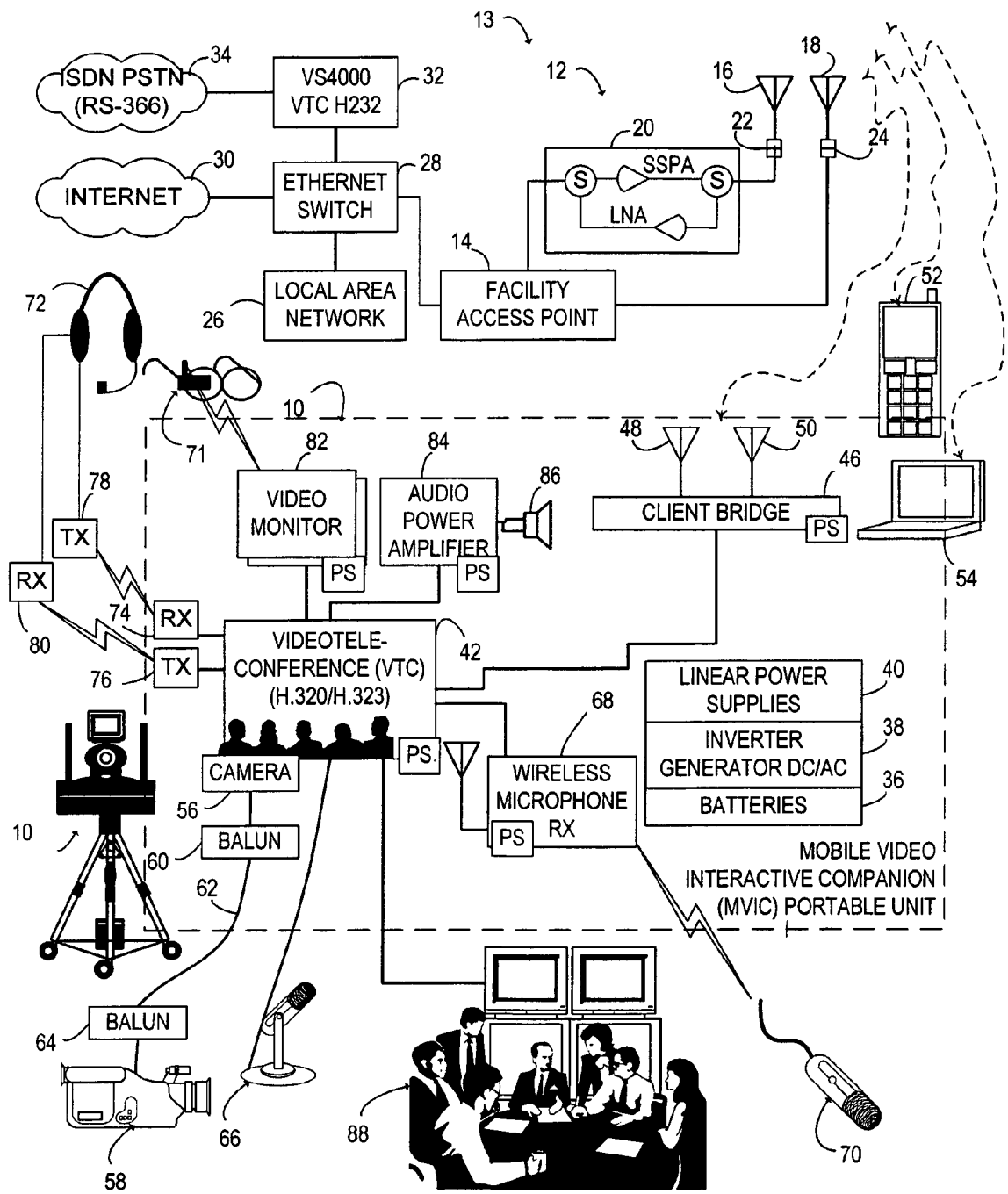
FIG. 1 depicts a block diagram of a Mobile Video Interactive Companion (MVIC) system wirelessly linked to an enhanced access point.

Turning to the Drawings, wherein like numerals denote like components throughout the several views, FIG. 1 shows a Mobile Video Interactive Companion (MVIC) portable unit 10 that maintains high quality videoconferencing and other digital services while roaming in or around a facility by advantageously grouping capabilities into the MVIC portable device 10 and by enhancing a facility access point assembly 12, thereby achieving a roaming VTC system 13.

It is generally known to place access points for wireless services. For instance, Symbol Technologies' Spectrum24® 4131 Access Point (AP) 14 provides wireless Local Area Network (LAN) performance required for advanced mobile networking and business-critical wireless voice and data application support, including 10/100 Base-T Ethernet connectivity, the industry's most open and advanced security. However, the Effective Isotropic Radiated Power (EIRP) from the generally-used AP 14 is quite limited. For instance, with the transmitter output power of 100 mW (20 dBm) and a 5.1 dBi or 7.5 dBi antenna gain, the EIRP is respectively 0.32 W and 0.56 W. Thus, any facility needing wireless networking requires numerous APs 14 spaced in working spaces. Even with such placement, the low EIRP prevents continuous communication when moving through the facility, especially from floor to floor and when moving about the ground outside of such a facility. The wireless networking devices linking through such APs 14 generally do not have high data rates and need two-way synchronization to maintain a videoconference. Thus, further issues such as distortion from Frequency Modulation (FM) multipathing were not deemed to be a major problem for Internet/Intranet communication.

APs 14 intended for packet data communication may be successfully modified to work for roaming videoconferencing, even with their typically low EIRP and their half-duplex broadcasting. Yet, a solution remains within the transmission limits dictated by federal regulation (47 CFR 15.247 "Operation within the bands 902-928 MHz, 2400-2483.5 MHz, and 5725-5850 MHz."). In a first exemplary version, the enhancements include utilizing two diversity antennas, each depicted as ceiling mount dipole antennas 16, 18, which overcome multipathing to minimize video image tears and audio drop out. Examples of these antennas 16, 18 include an omnidirectional CUSHCRAFT antenna model S2403BH12NF with 5.1 dBi antenna gain and a directional CUSHCRAFT antenna model S2307 MP10NF with 7.5 dBi antenna gain. This capability is often unused with typical AP 14 installations. An illustrative implementation includes an Access Point 4131 with Power supply/(2) Rubber Duckie Antennas/Bias-T available from Symbol as model AP-4131-1050-Z1-WW.

A solid state power amplifier (SSPA)/low noise amplifier (LNA) 20, such as an ANTENNAFIER™ model 2400 SEU by RF LINX CORP. of Sharonville, Ohio is custom designed to receive the 30 mW (14.77 dBm) from the AP 14, and to provide a transmit gain of 14 dB. Thus, with an antenna 16 with 5.1 or 7.5 dBi gain, an EIRP of 35.77 dBm is achieved, thereby remaining within the 4 W regulatory limit for direct sequence spread spectrum (DSSS) transmissions. The SSPA/LNA 20 rapidly switches between SSPA for transmit and LNA for receive and has a 20 dB receive gain. Connectors 22, 24 for each antenna 16, 18 have to be modified to install these modifications. The switching for at least the referenced SSPA/LNA 20 is sufficient for high quality video communication; even prior uses have been made only for more timing tolerant packet data communication with wireless Internet service providers.

A local area network (LAN) 26 may be connected to IP-base video/data systems, with the LAN 26 coupled to an Ethernet switch 28 for accessing Internet 30 and to a VS4000 videoconferencing (VTC) system 32 that is H.232 compliant for connecting through an ISDN (Integrated Switched Digital Networks Public Switched Telephone Network (PSTN) network 34 to other VTC locations. The facility access point 14 is connected to the Ethernet switch 28 to enable videoconferencing to these public and private networks.

Long term portable power is provided by batteries 36 that are converted by a DC-AC inverting generator 38 to a standard 110 $V_{RMS}$ 60 Hz output. Each component may use this power directly or convert it to an appropriate DC voltage with a number of linear power supplies 40. This approach has advantages of avoiding an expensive, dedicated DC-DC power supply that has to be modified for different configurations. Instead, economical power supplies ("PS") may be used. Another advantage of the MVIC portable unit 10 is that it may use an electrical outlet when available.

A videoconference (VTC) device 42 with H.320/H.323 connectivity is provided with a POLYCOM® VIEWSTATION® H.323 or TANDBERG 880 that is connected to the access point assembly 12 to a client bridge 46, such as the Spectrum 24® CB 1000 Client Bridge from Symbol Technologies with diversity antennas 48, 50.

Voice Over Internet Protocol (VOIP) may be accomplished for IP telephones 52. As another example, Internet access may be provided to general purpose computers, such as a laptop personal computer or personal digital assistant (PDA) 54.

The MVIC portable device 10 provides a number of options for input and output devices. The built-in video camera 56 may be augmented with a portable video camera 58. The portable video camera 58 allows for additional functionality such as flood lights, additional telephoto magnification, low lux lighting, videostabilization, etc. Extended distance may be achieved with a balun (balanced to unbalanced) device 60 coupled across a length of transmission cable 62 (e.g., 2000 feet) to another balun device 64. A wired microphone 66 may be used or a wireless microphone receiver 68 and wireless microphone 70, such a Series 100 wireless microphone system from SENNHEISER USA.

The portable video camera 58 may advantageously comprise a magnifying video scope useful for diagnostic imaging (e.g., physiological examinations, troubleshooting mechanical devices, etc.) In addition or as an alternative to other individually worn audio devices, a heads-up-display (HUD) 71 may be worn so that the individual at the remote site may perform tasks in addition to participating in a videoconference. For example, in consulting with a remote expert in repair or surgery, the HUD 71 may display information for a local individual, such as a checklist, a technical drawing, etc.

A wireless two-way headset 72 gives hands free advantages, especially when using the portable video camera 58. The headset 72 also allows operation in a noisy public or industrial setting. In order to achieve advantageous reception and distance, a Sennheiser HMD25-1 headset 72 is modified by replacing a 600 Ohm resistor in the earpiece circuit with a 70 Ohm resistor and by placing a 10 μF capacitor into the microphone circuit to block DC noise signals. At the VTC device 42, a wireless microphone receiver 74, such as a model EW122P by SENNHEISER, is coupled to a mixer input. A wireless transmitter for a headset 76, such as model EW522P by SENNHEISER, is coupled to the VTC device 42. The operator wears a wireless microphone transmitter 78, which is part of model EW122P, and wears a wireless receiver 80 that are in communication with their counterpart receiver 74 and transmitter 76, respectively.

It should be appreciated that wireless communication channels may advantageously include encryption to avoid or to at least reduce the likelihood of interception by third parties, enhancing the use for sensitive communications (e.g., private personnel information, trade secrets, etc.)

One or more video monitors 82, such as 6.8 inch Thin Film Transistor (TFT) Liquid Crystal Display (LCD) monitor (type 1) CM20-068NP from Century High-Tech Corp. (CCHT), are connected to the VTC device 42 so that individuals at the MVIC portable device 10 may receive videoconferencing. Also, an audio power amplifier 84 powers a speaker 86. Alternatively or in addition, dual 32 inch videomonitor devices 88 may be coupled to the MVIC portable device 10.

In an illustrative version that supports encryption of transmitted data, the MVIC portable device 10 includes a 3 Dbi dipole Antenna Omni, model ML-2499-HPA1-00; a Portawattz 400 Watt Xantrex, model 803-0450; an LCD Stand, model Anthro 0111-17; a POC Cart Standard, model POCCSM/LG; a Cisco 1310 Outdoor AP/BR w/RP-TNC, FCC Configuration model AIR-BR1310G-A-K9-R; a 20" LCD Video Monitor by Sharp model LC20S1UB; and a Polycom ViewStation H.323 Dual Monitor, model 2200-11323-001.

In another illustrative version with enhanced range (e.g., 3×), the MVIC portable device 10 includes Polycom ViewStation H.323 Dual Monitor, model 2200-11323-001; with a 13" LCD Video Monitor, Sharp model LC13B4US; a POC Cart Standard, model POCCSM/LG; a CB1000 with two external connectors BNC, by Symbol model CB-1000-0020-US; an LCD Stand, Anthro model 0111-17; a High Rate 11 Mbps Wireless LAN Adapter Connectors; an MMCX by Symbol model LA-4121-1100-US; and a Portawattz 400 Watt Xantrex, model 803-0450; and a 3 Dbi dipole Antenna by Omni model ML-2499-HPA1-00.

Figure 2:
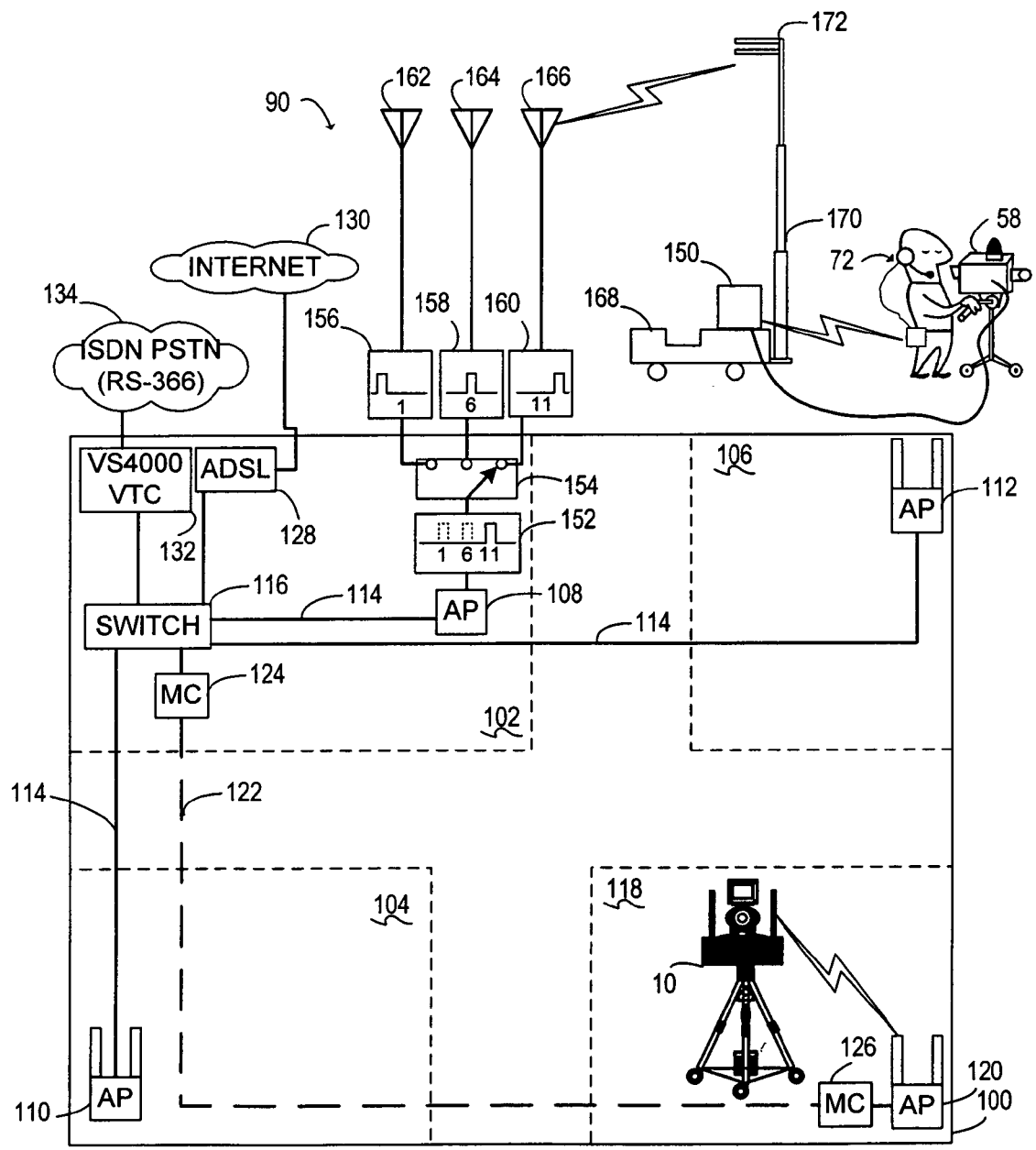
FIG. 2 depicts a block diagram of the MVIC system of FIG. 1 within an institution having a plurality of access points to allow roaming, and including an extended range outside the access points linked to an extended range MVIC system.

In FIG. 2, an MVIC portable device 10 is illustrated as part of a roaming VTC system 90 within a facility 100, which may comprise a relatively large building or campus. Some areas 102, 104, 106 are close enough (e.g., 328 feet) to have a respective access point assembly 108, 110, 112 coupled by conductor 114 to a 10/100BT switch 116. For a more distant area 118, an access point assembly 120 may include an optical fiber 122 of about 2 km or less in length interposed between a pair of media converters 124, 126.

These lengths of conductor 114 and optical fiber 122 have sufficient transmission times to maintain required synchronization for high-quality VTC communications. The switch 116 in turn is coupled to an Asymmetric Digital Subscriber Line (ADSL) 128 and hence to Internet 130. Alternatively or in addition, the switch may be coupled to a VTC device 132, such as a VS4000 POLYCOM, to thereby communicate via an ISDN PSTN network 134 to other VTC locations.

An example of an application such as depicted in FIG. 2 is a courtroom facility with multiple courtrooms, judge's chambers, etc. Conferences are facilitated when some of the parties are in other locations. Trial proceedings are enabled when an accused must be removed from the courtroom for disciplinary infractions. Closed circuit capabilities enhance viewing of exhibits and other evidence, such as recorded testimony and accident reconstruction modeling.

Alternatively or in addition to an MVIC portable device 10 with the afore-described antenna coupling to an access point assembly 108, 110, 112, 120, an increased range MVIC portable device 150 achieves a range from the access point 108 of about 10-16 km. Such placement may be ideal for facilities such as a zoo or nature preserve that have widely spaced exhibits that would benefit from an on-site VTC but the expense of hardwiring multiple AP assemblies 12 would be prohibitive. Increased transmission and reception at the AP 108 is achieved by incorporating a bandpass filter channel selector 152 coupled to a 1-6 programmable antenna selector 154 with each selectable channel 1-6 (only 3 being depicted) having a bandpass filter ("BPF") and SSPA/LNA's 156, 158, 160 tuned to one of the selectable BPF channels of BPT channel selector 152. Each BPF LNA 156, 158, 160 in turn is coupled to an elevated 60 degree azimuth YAGI antenna 162, 164, 166 respectively oriented to achieve a 360 degree coverage. The multiple antennas enable improved signal-to-noise ratio by directionally discriminating against interference. The enhanced range MVIC portable device 150 is depicted as transported on a utility vehicle 168 that supports a light-weight, telescoping antenna mast 170 capped with directional YAGI antennas 172. The MVIC portable device 150 may then incorporate some or all of the options described in FIG. 1, with a wireless headset 72 and portable camera 58 being depicted in FIG. 2. The roaming VTC system 90 is thus able to determine the best antenna 162-166 to communicate with the MVIC portable device 150, providing high-quality VTC services thereto even across an expansive installation.

Figure 3:
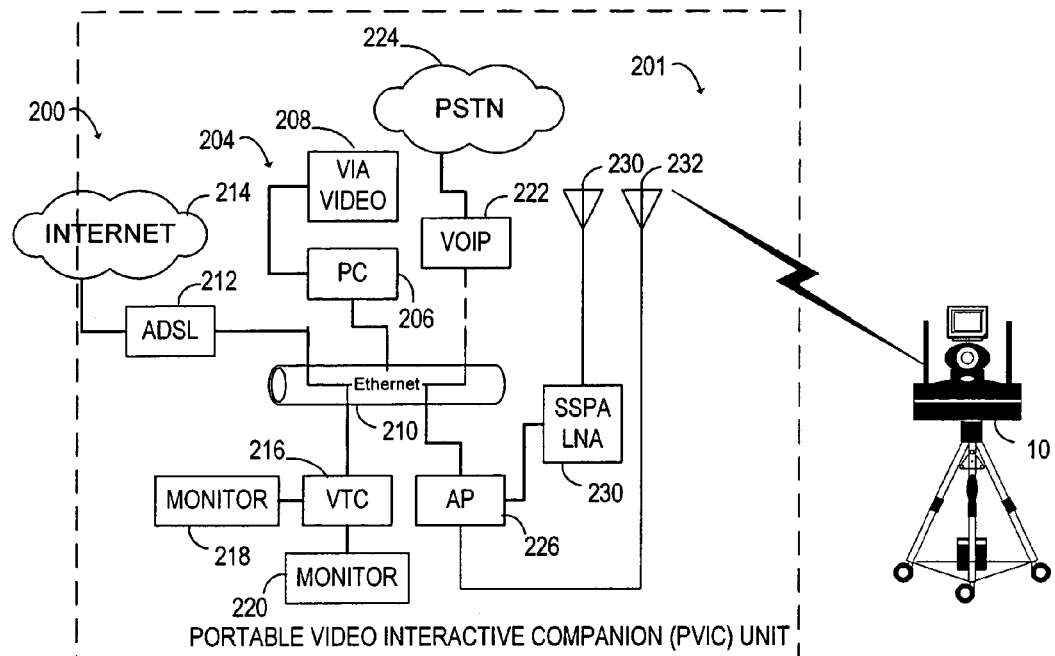
FIG. 3 depicts a block diagram of an enhanced directional access point linked to an MVIC system placed in an austere, obstructed location such as a construction site.

In FIG. 3, another exemplary version shows a roaming VTC system 200 that has particular advantages for project supervision at a work site 201 (e.g., building/highway construction) wherein increased transmission EIRP is allowable and terrestrial AP assemblies 12 are available. For illustrative purposes, a VTC device 202 at a central work site location 204 is depicted as a PC 206 given modest VTC capabilities by PC-based VTC system 208, such as a VIA VIDEO Professional Video Conferencing Appliance from POLYCOM. An Ethernet switch 210 supports connectivity with other elements at the central work site location 204 or a remote location, such as a 384/768 kB connection via an ADSL 212 to Internet 214. Alternatively or in addition to a VTC device 202, a full VTC device 216 with monitors 218, 220 may be available at the central work site location 204. The Ethernet switch 210 may further provide telephone service to the entire work site 201 by including a VOIP device 222 connected to a PSTN 224.

An advantageous ability for communicating an increased distance or through an additional interfering structure or emissions within the work site 201 is provided by remaining within a 1-to-3 FCC rule. An access point 226 has one output coupled through a SSPA LNA 230 custom engineered by RF LINX to a 0.5 W gain that in turn is coupled to one of two diversity YAGI antennas 230, 232 each having 15 dBi of antenna gain. Thereby, an EIRP of 16 W is achieved. Thus, the MVIC portable device 10 may be advantageously placed some distance away or within a partially constructed structure, allowing increased project coordination without the inconvenience of having to visit the specific site in question.

Figure 4:
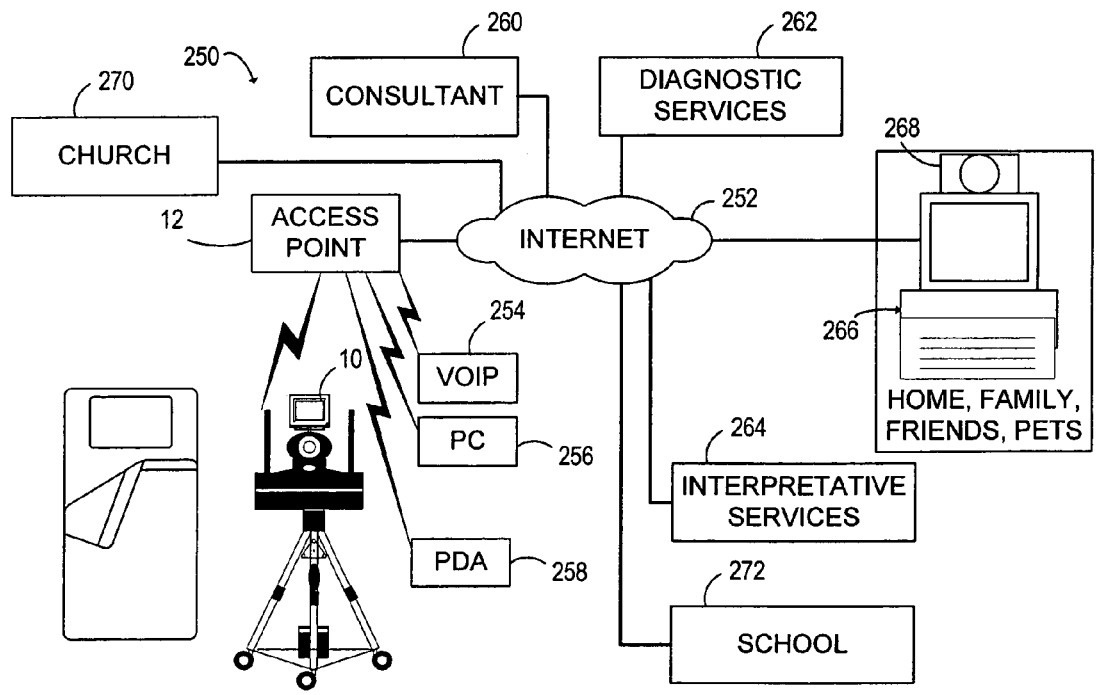
FIG. 4 depicts a block diagram of an exemplary institution benefiting from the MVIC system, specifically healthcare delivery.
Figure 6:
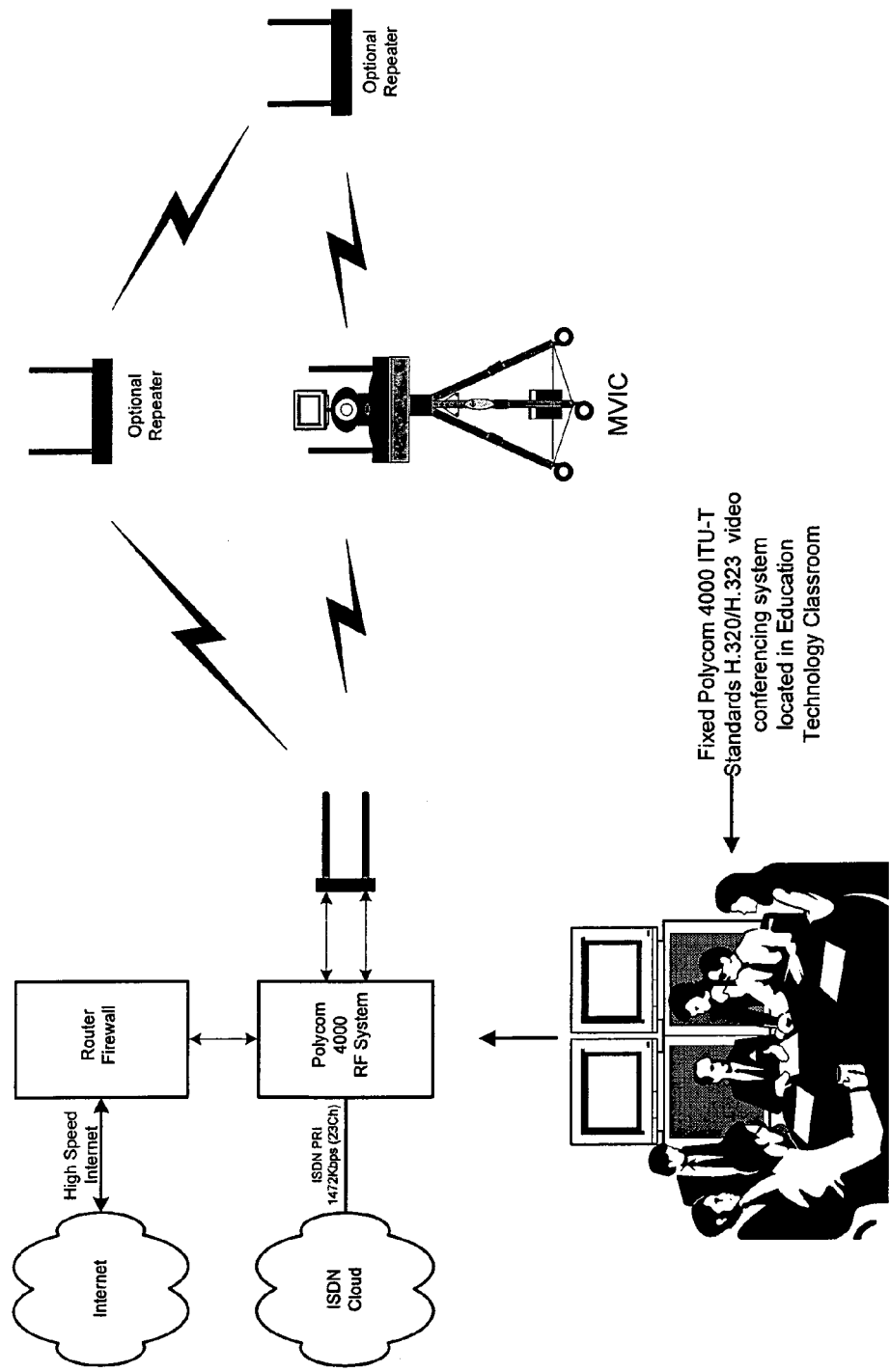
FIG. 6 depicts a block diagram of a MVIC system communicating to a fixed VTC system.
Figure 7:
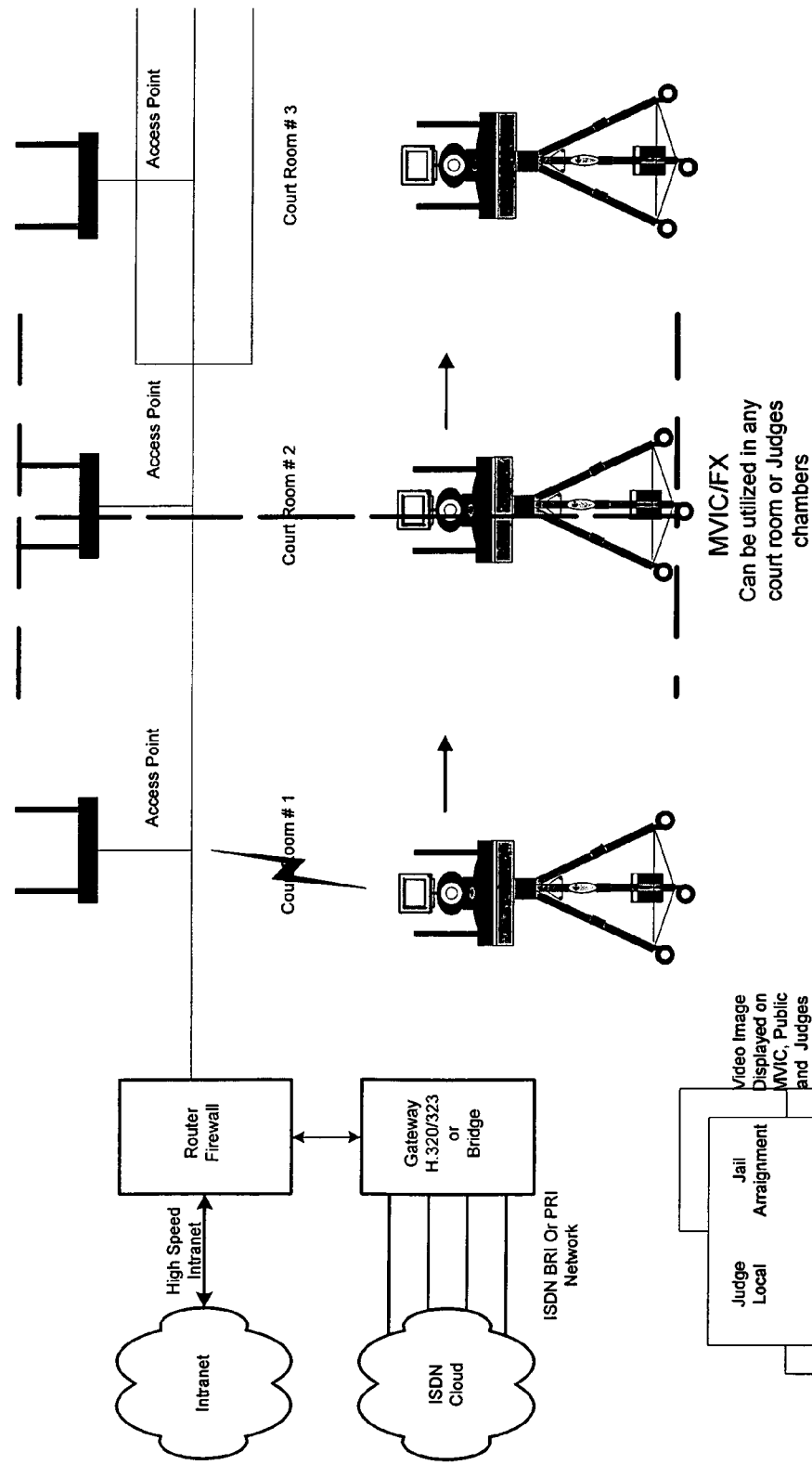
FIG. 7 depicts a block diagram of one or more MVIC systems used in video arraignment application.
Figure 8:
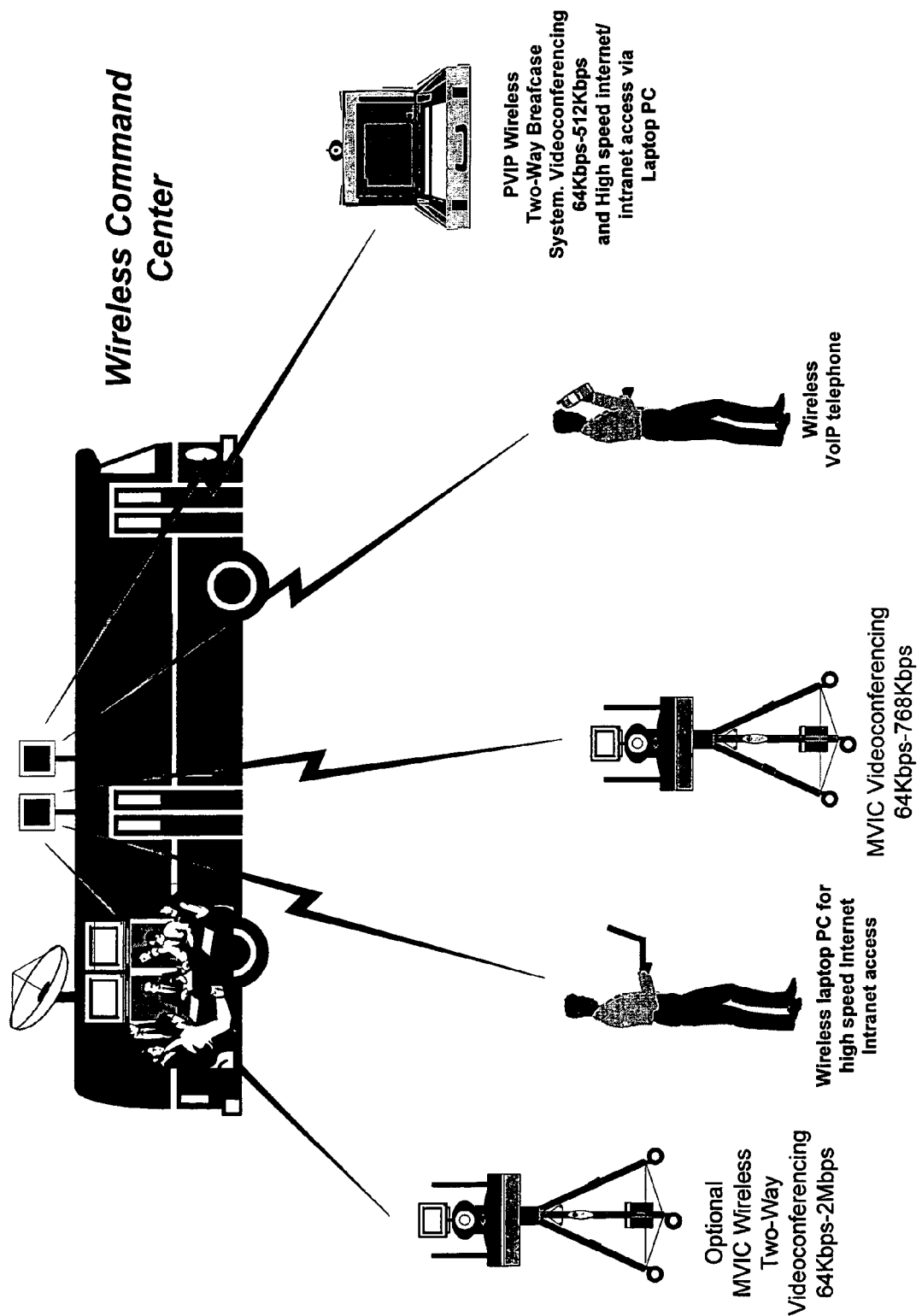
FIG. 8 depicts a block diagram of a wireless command center communicating with a plurality of wireless devices and MVIC systems.
Figure 9:
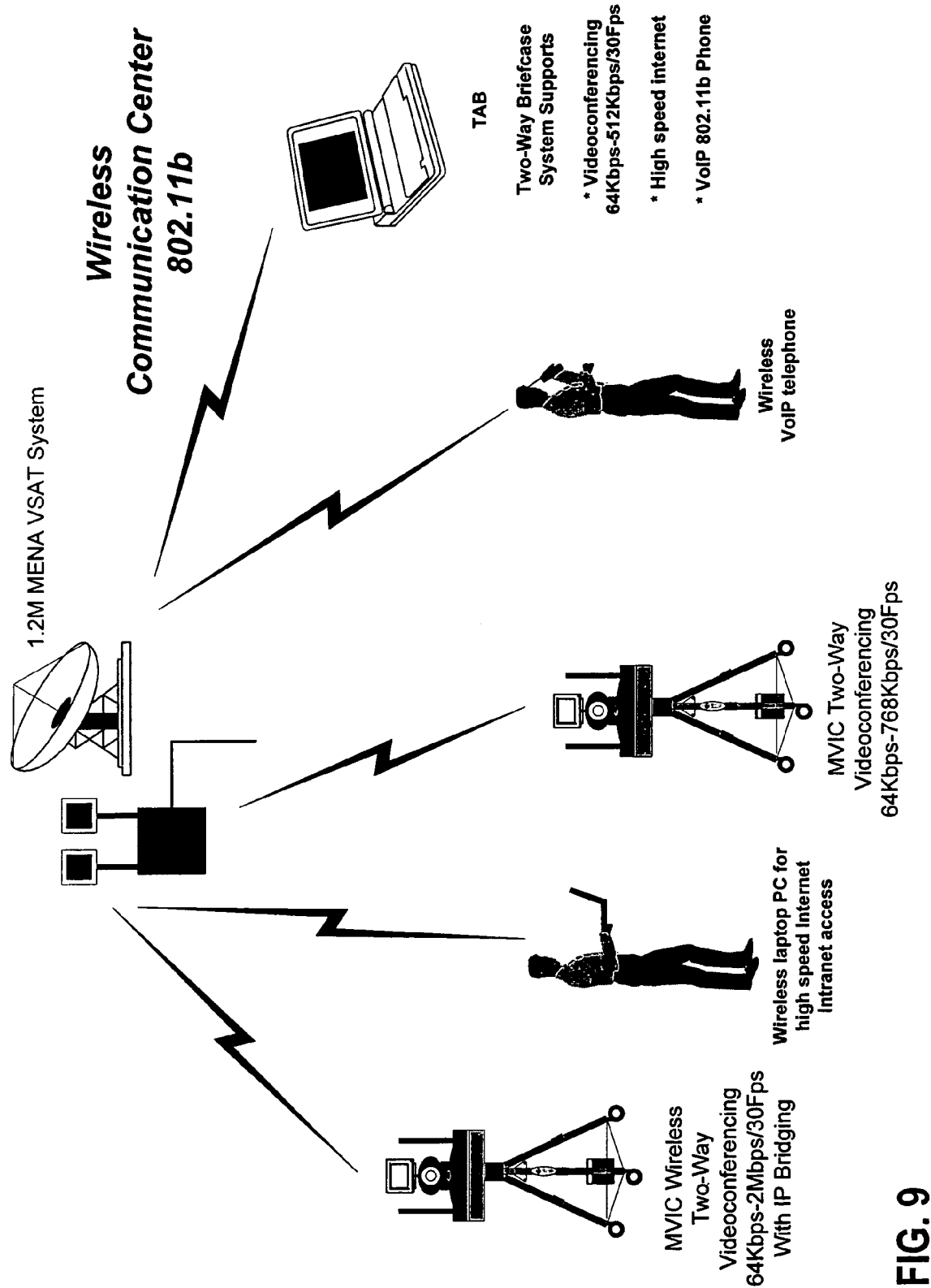
FIG. 9 depicts a block diagram of a wireless communication center 802.11b in communication with a plurality of wireless devices and MVIC systems.
Figure 10:
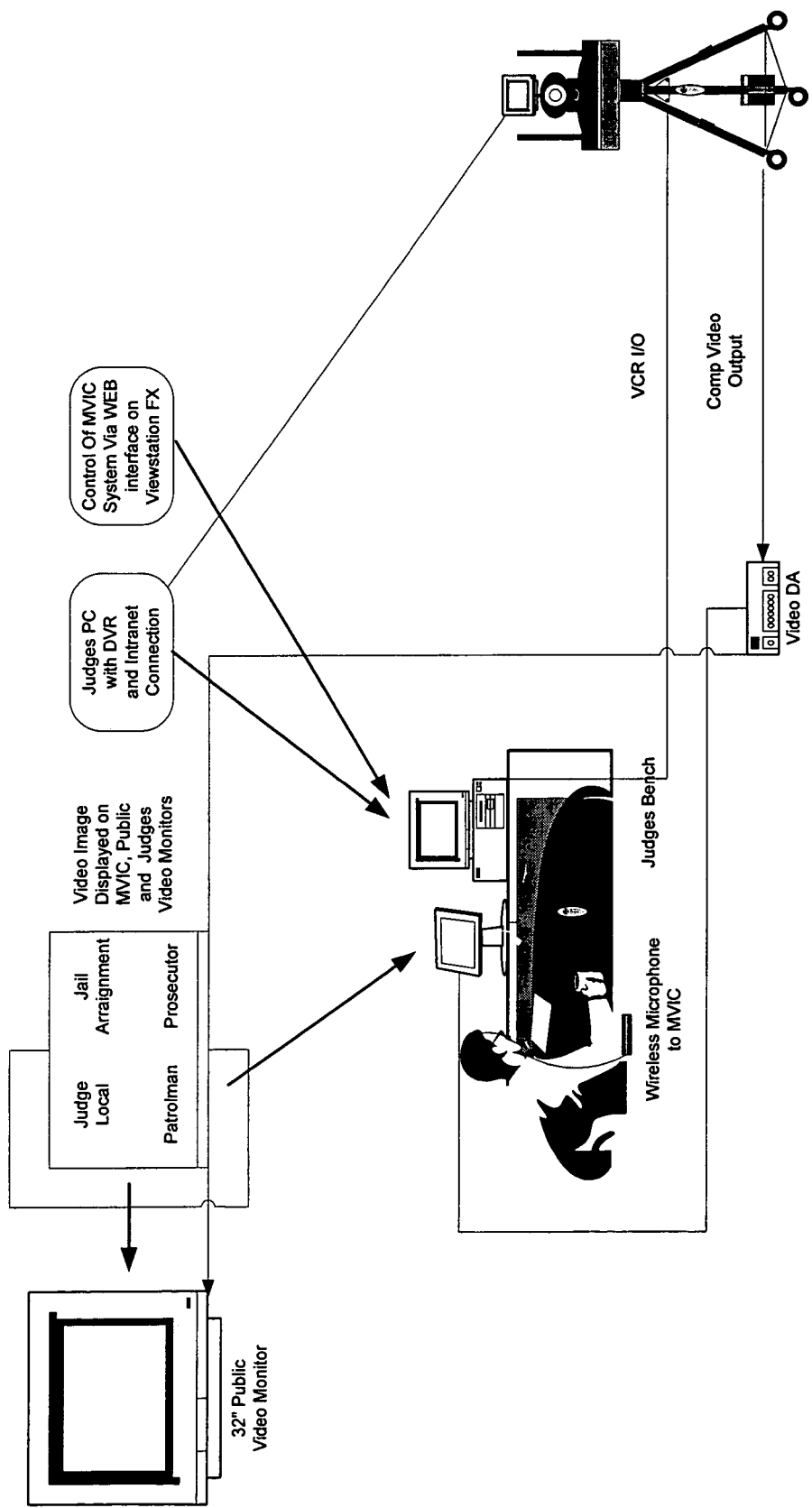
FIG. 10 depicts a block diagram of a legal proceeding in a courtroom facility incorporating an MVIC system and a plurality of dispersed display devices.
Figure 11:
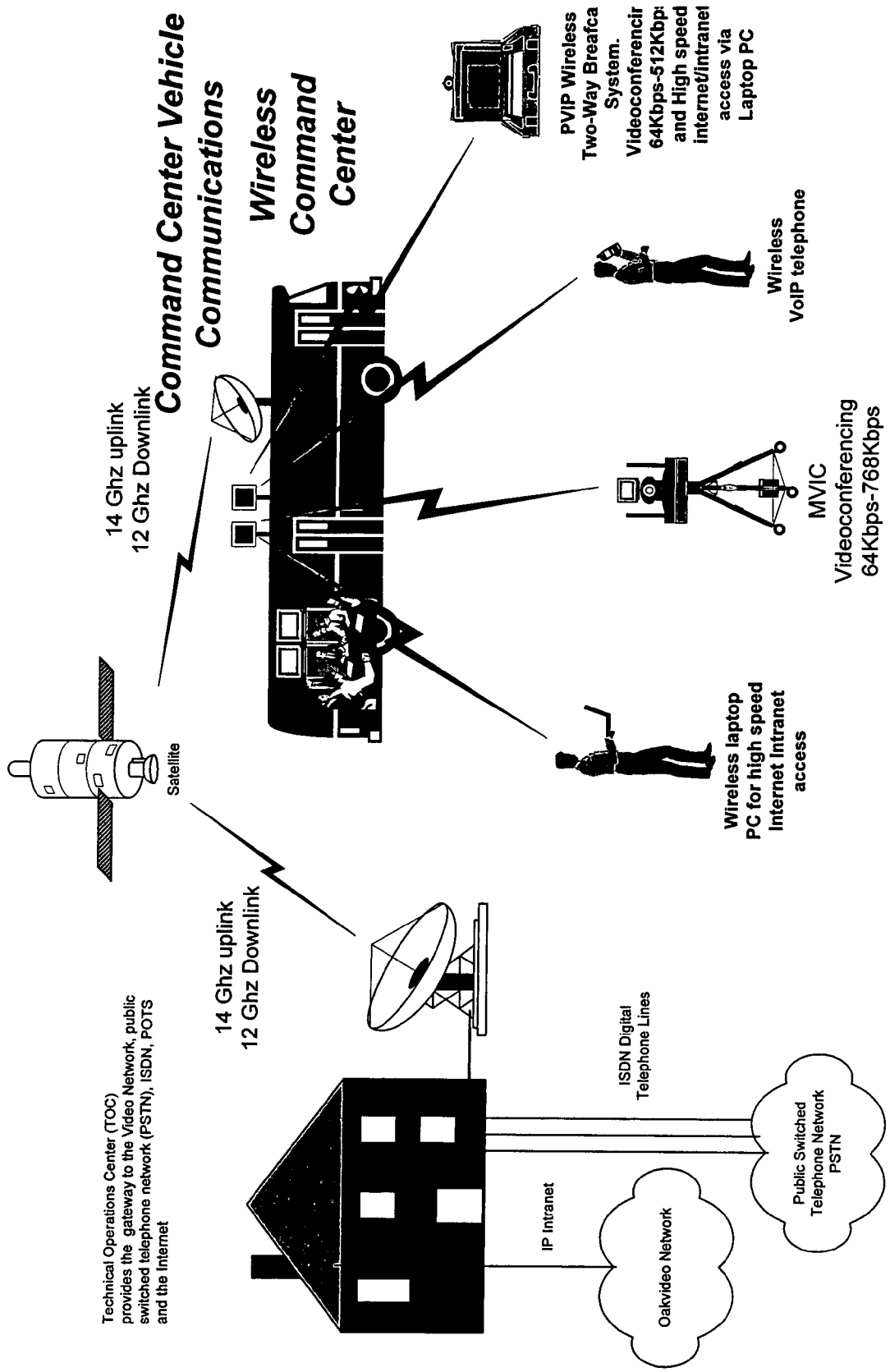
FIG. 11 depicts in a block diagram the command center vehicle of FIG. 8 communicating via satellite with a technical operations center to terrestrial networks.
Figure 12:
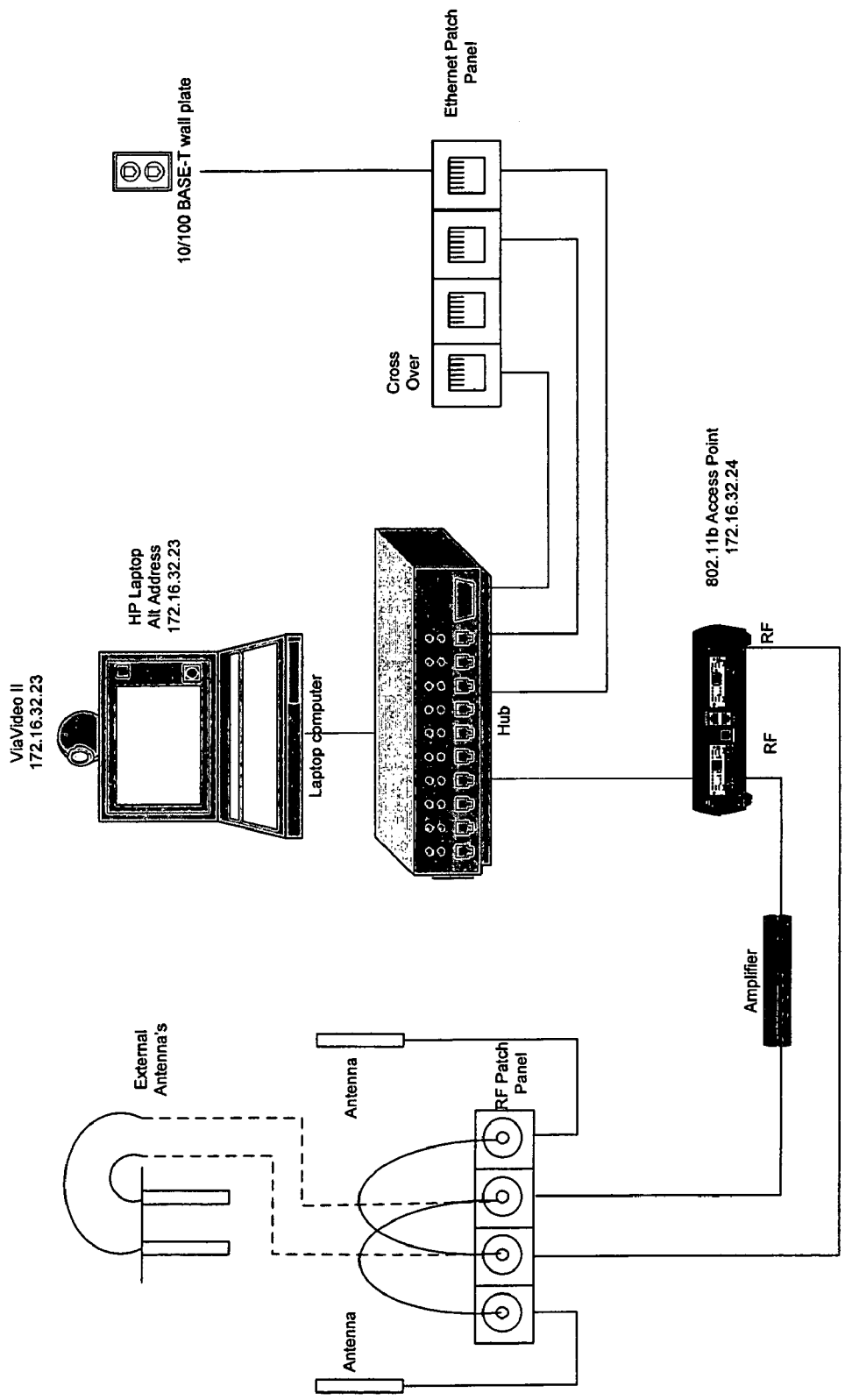
FIG. 12 is a block diagram of a personal video interactive companion (PVIC).
Figure 13:
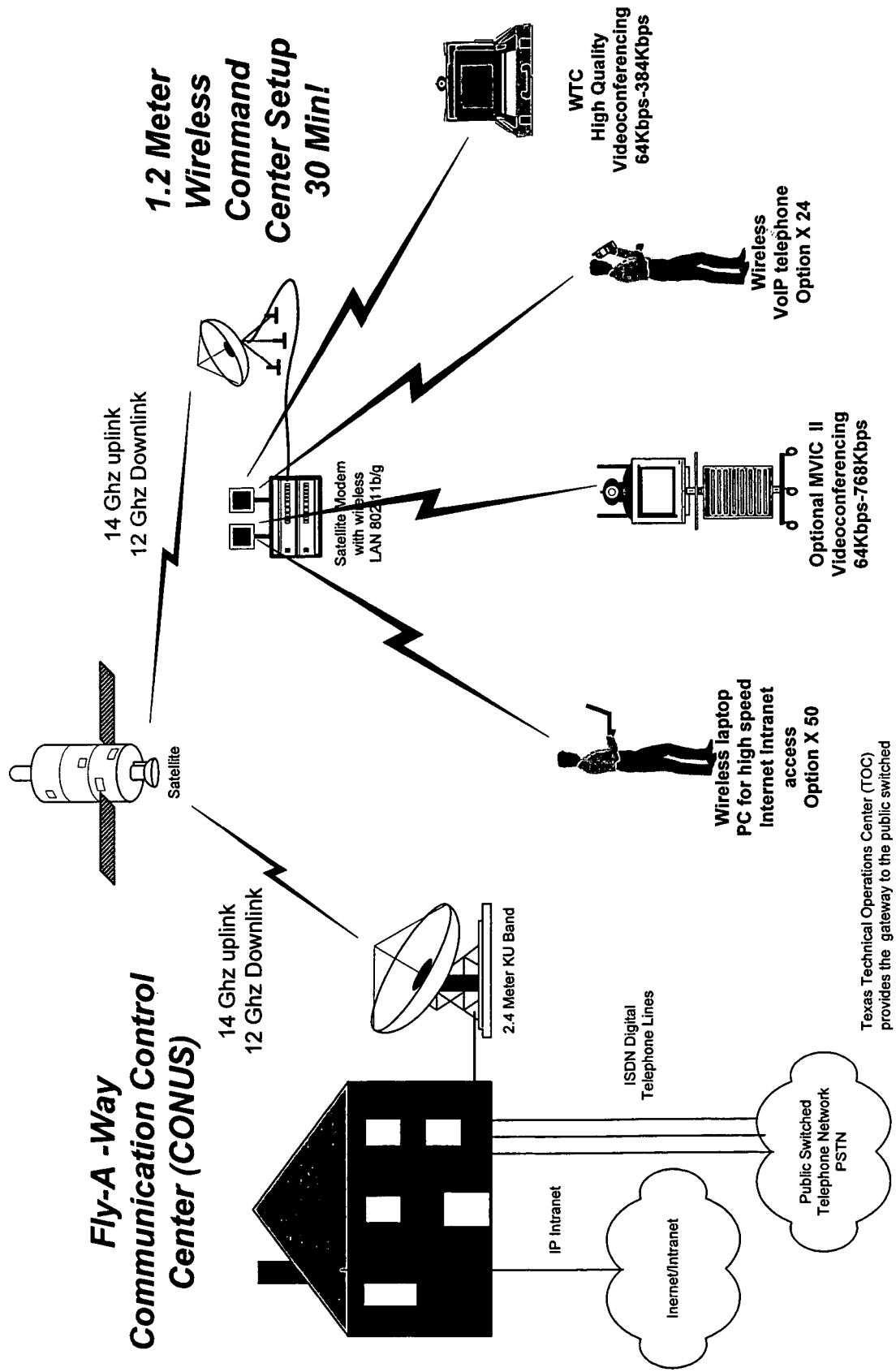
FIG. 13 is a block diagram of a 1.2 Meter wireless command center in communication with a plurality of wireless devices and MVIC systems and with a technical operations center via a satellite, and thus terrestrial networks.
Figure 14:
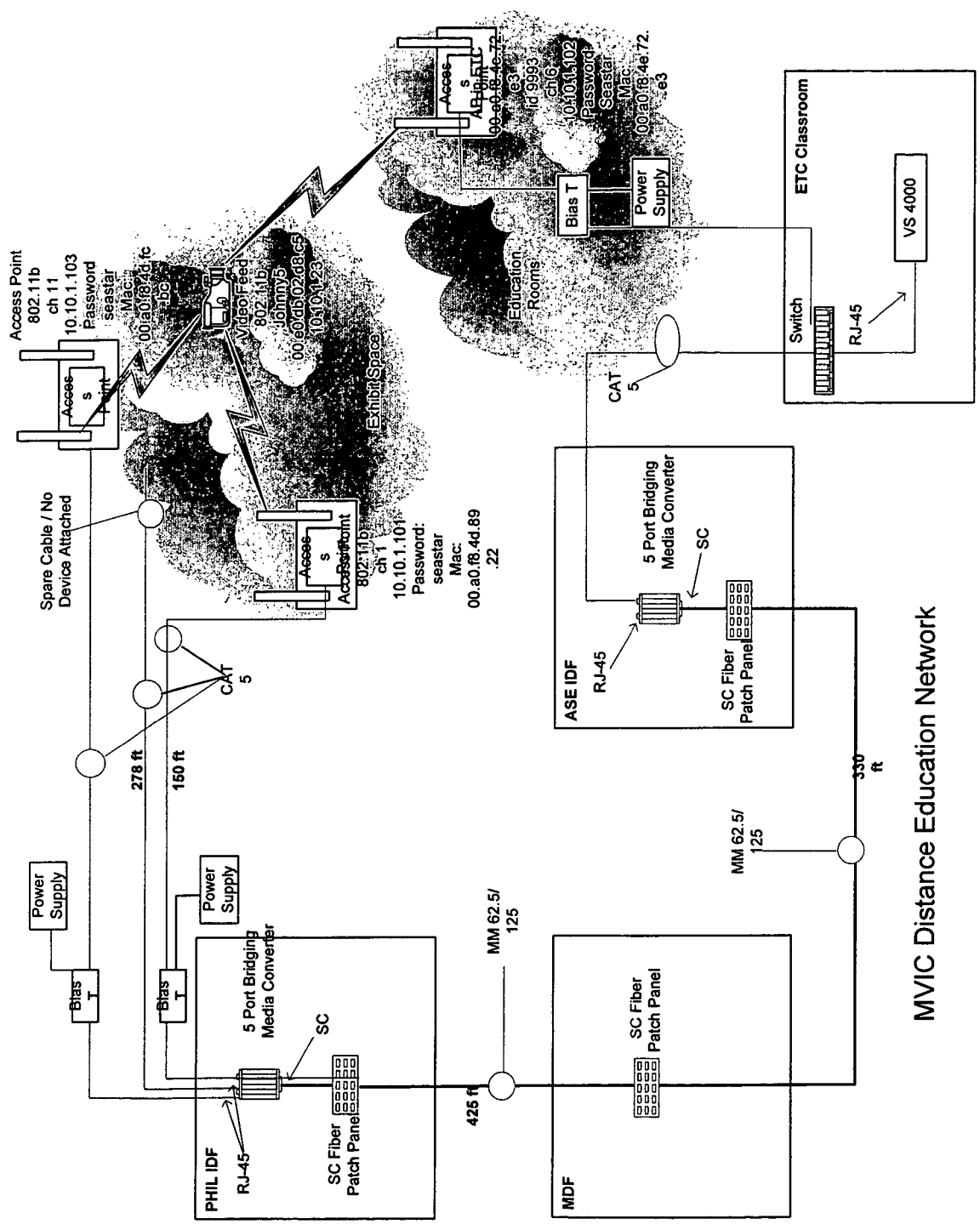
FIG. 14 is a block diagram of an MVIC system used within a distance education network.
Figure 15:
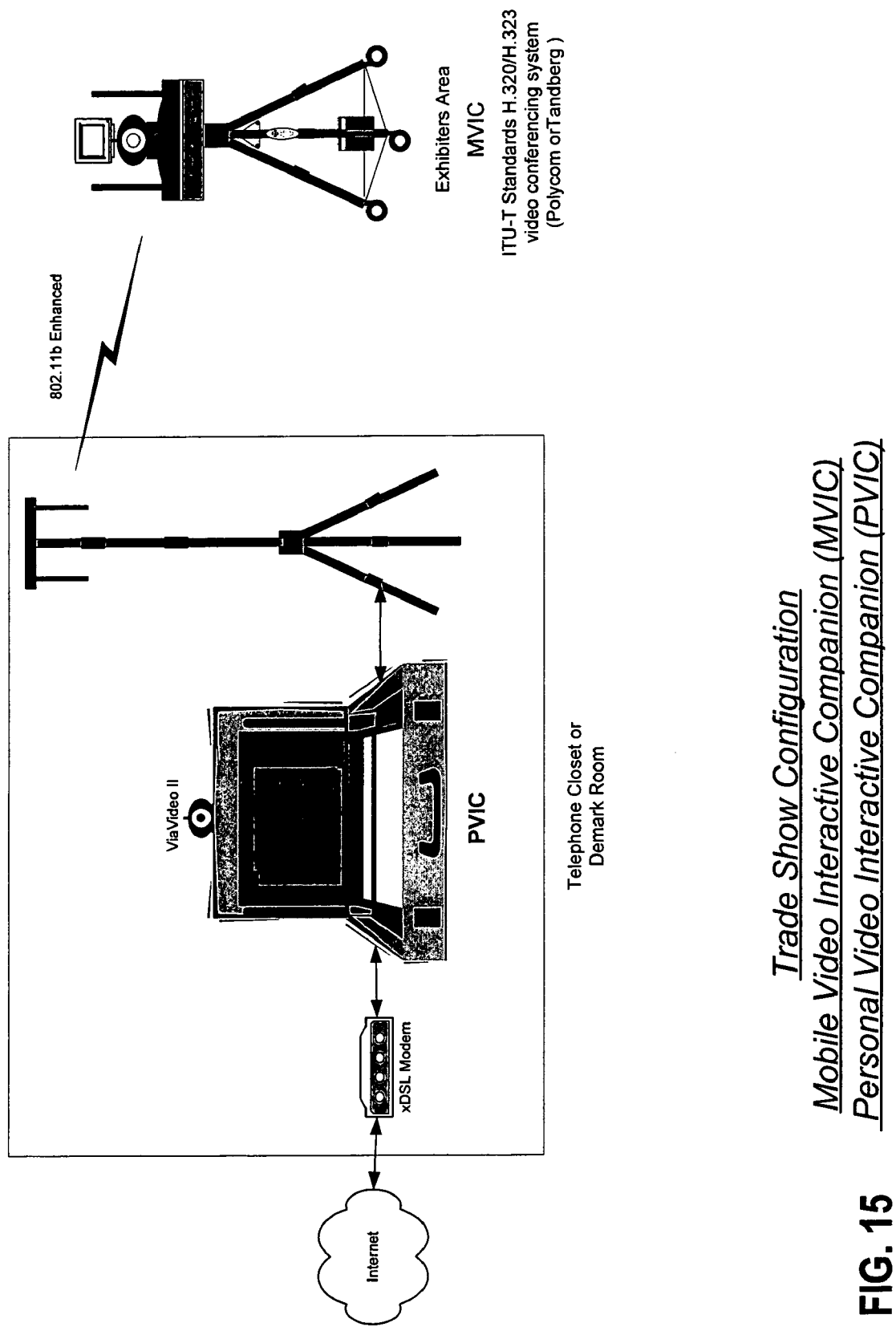
FIG. 15 is a block diagram of a PVIC of FIG. 12 in communication with the MVIC system of FIG. 1.

FIG. 4 further illustrates the utility and flexibility of the present invention by showing another exemplary roaming VTC system 250 in a therapeutic situation where high quality VTC capabilities are necessary for remote caregivers or emergency responders to exchange sufficient resolution diagnostic data when assessing a patient in a rural area or in-transit. As another example, a patient, remote from family and friends, could benefit from being in more intimate contact than an audio-only telephone call would permit. Additionally, in a hospital, it would be beneficial not to have to install ISDN lines to every room when only a very few at any given time could benefit from a VTC connection. Moreover, often it is not advisable to move the patient to a fixed VTC room.

In this illustrative configuration, the MVIC portable device 10 is placed at a patient location within range of an AP assembly 12, and may provide any or all of the video/audio/data services as depicted in FIG. 1, such as access to Internet 252 to a VOIP device 254, a PC 256, and a web-enabled device such as a Personal Digital Assistant (PDA) 258. Diagnostic or therapeutic devices may also be communicated therefrom to entities such as a consultant 260 (e.g., specialist), a diagnostic services provider 262 and an interpretative services provider 264 (e.g., foreign language translator). A family member or friend may economically communicate with the patient via an Internet-coupled PC 266 given VTC capability with a VIA VIDEO or similar device 268. The patient may also obtain remote communication with a church 270 and/or a school 272.

It should be appreciated that a portable stand in various applications may include features such as a pressurized, telescoping adjustment for raising the display to an appropriate height. Further, in some executive style applications, a wide base may support two large display monitors, similar to generally corded VTC systems.

In FIG. 5, a reduced size Wearable Interactive Companion (WVIC) portable unit 300 provides many of the features for videoconferencing, yet may be worn for enhanced portability. Specifically, the components thereof are carried in a backpack 302 to a remote location, whereupon a tripod 304 is set up to support a lightweight display (e.g., LCD) 306 and video camera/microphone 308 (e.g., SONY MINI DV camcorder). A VTC (e.g., SONY PSI video communication system) provides two-way audio to an operator via headset 312 and to others at the remote site by a speaker 314 powered by a 1 W amplifier 316. The VTC 310 is connected to the camcorder/microphone 308 and display 306 for two-way video communication. A client bridge 318, such as previously described, is connected to the VTC 310 by an Ethernet to wirelessly communicate with an access point 12. The individual components of the WVIC portable unit have AC transformer power supplies 320 that are powered by a combination of a power interface 322, AC/DC converter 324, and batteries 326.

By virtue of the foregoing, a videoconferencing system is no longer tethered to a group room by the necessity of ISDN wiring and facility scheduling limitations. Thereby, support staff may be connected with customers on their product floor, reducing the resolution time for perhaps complex technical issues. Products and facilities in one part of the world may be showcased to potential clients in another as part of a truly interactive tour. As another example, military personnel being deployed may take advantage of the flight time to interactively brief and debrief missions. As yet a further example, distance education, telemedicine, construction management and manufacturing, among others, are enhanced. Generally-known videoconferencing has enabled, to an extent, organizations to overcome time and distance with resultant reduction in hard and soft costs associated with collaborations. However, in today's competitive marketplace, organizations are receptive to a means to extend their traditional videoconferencing capabilities.

In the computing world, the need to distribute computing beyond the "glass house" where mainframes resided resulted in the explosion of client-server networks. A similar paradigm shift is occurring today in videoconferencing, enabled further by a mobile, wireless videoconferencing solution that may implemented nearly anywhere. Thereby the benefits of collaboration by videoconferencing may be realized. These benefits are breaking down barriers due to distance, thereby increasing productivity and reducing costs. All of this builds upon a more modest amount of collaboration has hitherto been provided by fixed equipment. Leaving behind these "islands of cooperation", no longer must collaboration be rationed by a facility schedule nor the content constrained by what may be brought into the room. Instead, wireless networks emerge as a flexible, robust, and cost effective means to extend data networks and to connect businesses internally and externally with customers. The advantageous end-to-end wireless videoconferencing solution delivers reliable, high quality video collaboration without wires, leveraging the scalability and adaptability of a wireless local area network (WLAN) to provide superior videoconferencing even for the heavy demands of video. Any space then becomes a "collaborative zone" with a minimum of set-up.

It should be appreciated that this approach provides a product with a focus on mobility, flexibility and above all quality. A robust, wireless connection ensures excellent video and voice quality by integrating "best of breed" group room systems onto a mobile chassis. Far end camera controls allow the user to pan, tilt and zoom the remote camera. Clear audio output is augmented by an ability to connect a wireless lavaliere microphone or headset with a boom microphone for noisy production environments. The illustrative solution adheres to the 802.11×standard for wireless local area networks. No additional FCC license is required.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. Examples of various applications are depicted in FIGS. 6-15.

As an example, a similar roaming VTC system may be employed in a courtroom complex wherein multiple courtrooms and judge's chambers would benefit from VTC. For example, certain conferences may be more efficiently conducted with some parties remote to the proceeding (e.g., video arraignments). However, many old public facilities such as a courtroom complex may find wiring for all of the necessary ISDN connections to be cost prohibitive.

Other examples of situations benefiting from a similar roaming VTC system include periodic nursing checks of homebound patients, and troubleshooting machines remotely to avoid the delay and expense of sending an expert technician.

It should be appreciated that mobile videoconferencing brings an unprecedented dimension to an organization collaborative portfolio. For example, a manufacturer of large, complex systems such as aircraft, motor vehicles, and die/mold machinery are often confronted with challenges of coordinating completion, shipping and assembly of a large number of components. Many subassemblies require lead times of months or years with vendors and integrators scattered geographically. Being able to resolve complex issues often requires the increased communication afforded by videoconferencing. Many of these videoconferences would ideally include difficult to reach locations where assembly occurs. As another example, leveraging diagnostic and scientific expertise is enabled by allowing high value employees to remain in the principal work location. A larger number of technicians may be supervised remotely by this expert. Having the mobile videoconferencing system under the remote control of the expert allows the expert to look at what they choose to view, perhaps controlling a diagnostic magnification system, for instance. The remote technician may benefit from a heads up display by being able to perform tasks with the augmentation of remotely conveyed display information.

As yet a further example, marketing products in a global economy present a challenge to companies throughout the world. Large investments occur in research, development, and testing of a product. Defining and shaping brand presence is a final challenge. Close cooperation is required with partners who sell products to consumers in order to understand the consumer market for new products. A global consumer products company invests in creating a virtual marketplace to test their marketing and packaging with their partners and consumers. Focus groups are brought in to walk the aisles and to comment upon the packaging, design, and marketing. The challenge is in garnering marketing information beyond the geographic region where the virtual marketplace is located. Customer perceptions differ based on a number of factors to include geographic region and culture. MVIC allows such companies to overcome the time and distance barrier by bringing MVIC, and thus the virtual marketplace, to a desired focus group and to distant partners throughout the world. These groups may tour the facility in real time from virtually anywhere on the planet. Travel costs are reduced and there is no need to increase capital costs by replicating the virtual marketplace on a regional basis. The true benefit is the ability to leverage this feedback into creating a highly desirable brand that captures the marketplace. As yet a further example, marketing products in a global economy present a challenge to companies throughout the world. Large investments occur in research, development, and testing of a product. Defining and shaping brand presence is a final challenge. Close cooperation is required with partners who sell products to consumers in order to understand the consumer market for new products. A global consumer products company invests in creating a virtual marketplace to test their marketing and packaging with their partners and consumers. Focus groups are brought in to walk the aisles and to comment upon the packaging, design, and marketing. The challenge is in garnering marketing information beyond the geographic region where the virtual marketplace is located. Customer perceptions differ based on a number of factors to include geographic region and culture. MVIC allows such companies to overcome the time and distance barrier by bring MVIC, and thus the virtual marketplace, to a desired focus group and to distant partners throughout the world. These groups may tour the facility in real time from virtually anywhere on the planet. Travel costs are reduced and there is no need to increase capital costs by replicating the virtual marketplace on a regional basis. The true benefit is the ability to leverage this feedback into creating a highly desirable brand that captures the marketplace.

As yet an additional example, a global medical device company may have invested in state of the art operating rooms at their research facility for use in real world demonstrations of their cutting edge products. A renowned surgical staff specifically trained in utilizing this new technology perform these procedures. While surgeons, physicians and health care professionals from around the world are often invited to view these procedures, distance is an obstacle. Many cannot afford the opportunity cost of travel time to visit the operating room. Using MVIC allows this medical device company to demonstrate their innovations in a most convincing manner yet be convenient to their potential customers' needs. The mobility and wireless nature of the MVIC allows its unobtrusive use in an operating room with superior video, voice and data exchange. Furthermore, the mobility of MVIC allows for interactive tours of the facility.

What is claimed is:

1. A remote videoconferencing system, comprising: first and second diversity antennas; a wireless access point in communication with a digital data network having a transmit channel in communication with the first diversity antenna and a receive channel in communication with the second diversity antenna; an amplifier coupled to a selected one of the transmit and receive channels of the wireless access point to the respective one of the first and second diversity antenna to increase transmission range to the portable videoconferencing unit; and a portable videoconferencing unit, comprising: a carrier, an antenna in communication with the wireless access point, a digital bridge coupled to the antenna, a group videoconferencing system connected to the digital bridge, a portable power supply, and a display wherein the amplifier further comprises a combination solid state amplifier coupled to the transmit channel and a low noise amplifier coupled to the receive channel, the amplifier further comprising switching circuitry responsive to a transmit/receive status of the wireless access point to actively switch between operation of the solid state amplifier and the low noise amplifier.

2. A remote videoconferencing system, comprising: a plurality of directional antennas, each antenna having directional antenna gain, each of the plurality of directional antennas aimed differently in azimuth; a wireless access point in communication with a digital data network and with the plurality of directional antennas; and a portable videoconferencing unit, comprising: a carrier, an antenna in communication with the wireless access point, a digital bridge coupled to the antenna, a group videoconferencing system connected to the digital bridge, a portable power supply, and a display, wherein said remote videoconferencing system wherein further comprising increased transmission and reception at the access point is achieved by incorporating a bandpass filter channel selector, a programmable antenna selector having a plurality of selectable channels corresponding to and coupled via a bandpass filter and low noise amplifier to a selected one of the plurality of directional antennas.

* * * * *